(12) United States Patent
Chang

(10) Patent No.: US 8,858,056 B2
(45) Date of Patent: Oct. 14, 2014

(54) LIGHT GUIDE PLATE AND CORRESPONDING BACKLIGHT MODULE

(75) Inventor: Kuangyao Chang, Shenzhen (CN)

(73) Assignee: Shenzhen China Star Optoelectronics Technology Co., Ltd., Guangdong (CN)

( * ) Notice: Subject to any disclaimer, the term of this patent is extended or adjusted under 35 U.S.C. 154(b) by 41 days.

(21) Appl. No.: 13/574,569

(22) PCT Filed: Apr. 20, 2012

(86) PCT No.: PCT/CN2012/074453
§ 371 (c)(1),
(2), (4) Date: Jul. 20, 2012

(87) PCT Pub. No.: WO2013/155706
PCT Pub. Date: Oct. 24, 2013

(65) Prior Publication Data
US 2013/0279191 A1    Oct. 24, 2013

(30) Foreign Application Priority Data

Apr. 18, 2012  (CN) .......................... 2012 1 0113728

(51) Int. Cl.
*F21V 7/04*     (2006.01)
(52) U.S. Cl.
USPC ........... 362/620; 362/619; 362/627; 362/628; 362/633
(58) Field of Classification Search
USPC ..................... 362/619, 620, 627, 628, 633
See application file for complete search history.

(56) References Cited

U.S. PATENT DOCUMENTS

| | | | | |
|---|---|---|---|---|
| 7,370,999 | B2* | 5/2008 | Feng et al. | 362/619 |
| 7,845,840 | B2* | 12/2010 | Fang et al. | 362/620 |
| 7,918,597 | B2* | 4/2011 | Kunimochi | 362/608 |
| 2006/0279679 | A1* | 12/2006 | Fujisawa et al. | 349/116 |
| 2007/0097709 | A1* | 5/2007 | Hsieh | 362/620 |
| 2007/0177403 | A1 | 8/2007 | Hsiao et al. | |
| 2008/0068862 | A1* | 3/2008 | Shimura | 362/619 |
| 2008/0137373 | A1* | 6/2008 | Li | 362/620 |
| 2009/0033832 | A1* | 2/2009 | Pai | 349/65 |
| 2009/0086507 | A1* | 4/2009 | Iwasaki | 362/613 |
| 2009/0129120 | A1* | 5/2009 | Chen et al. | 362/620 |
| 2010/0014318 | A1* | 1/2010 | Chi et al. | 362/620 |
| 2010/0128495 | A1* | 5/2010 | Wang et al. | 362/620 |
| 2011/0096570 | A1* | 4/2011 | Vissenberg et al. | 362/615 |

FOREIGN PATENT DOCUMENTS

| | | |
|---|---|---|
| CN | 101351728 A | 1/2009 |
| CN | 102313195 A | 1/2012 |
| JP | 10-123332 A | 5/1998 |

* cited by examiner

*Primary Examiner* — Jong-Suk (James) Lee
*Assistant Examiner* — Bryon T Gyllstrom
(74) *Attorney, Agent, or Firm* — Muncy, Geissler, Olds & Lowe, P.C.

(57) ABSTRACT

The present invention relates to a light guide plate and a corresponding backlight module. The light guide plate has a plate body, a light-exiting prism structure and a reflecting prism structure. The reflecting prism structure is mounted on a reflecting area on a light-exiting surface of the plate body. The light guide plate and the corresponding backlight module can reduce light leakage at the junction between the light guide and a fixing plastic frame by the reflecting prism structure mounted at sides of the light guide plate.

6 Claims, 3 Drawing Sheets

LIGHT GUIDE PLATE AND CORRESPONDING BACKLIGHT MODULE

BACKGROUND OF THE INVENTION

1. Field of the Invention

The present invention relates to a field of liquid crystal display technology, especially to a light guide plate and a corresponding backlight module that can reduce light leakage at edge sides.

2. Description of the Related Art

Liquid crystal display devices have been widely used in many kinds of electronic products. Liquid crystal display devices are mostly backlight-type liquid crystal devices that have a liquid crystal panel and a backlight module. Backlight modules are sorted into side-light type and direct-light type based on the incident position of their light sources, wherein side-light type backlight module is more used.

In order to increase the brightness of a backlight module as more as possible, designers have developed a prism light guide plate. With reference to FIG. 1, which is a structural view of a conventional side-light type backlight module having a prism light guide plate, the side-light type backlight module includes a light guide plate, a light source 12 and a fixing plastic frame 13. The light guide plate is a kind of prism light guide plate that has multiple light-exiting strip-shaped prisms 110 parallel with each other and mounted on a light-exiting surface 115 of the light guide plate. Each of the light-exiting strip-shaped prisms 110 has a cross-sectional direction X that is basically parallel with an incident surface 112 of the light guide plate. The light source 12 generally is an LED light bar. The fixing plastic frame 13 is used to fix the light guide plate. After lights of the light source 12 are transmitted into the light guide plate from the incident surface 112, the lights that propagate along an extension direction Y (which is basically perpendicular to the incident surface 112 of the light guide plate) of the light-exiting strip-shaped prisms 110 may have a longer propagation distance due to total internal reflection; and the lights that propagate along the cross-sectional direction X of the light-exiting strip-shaped prisms 110 may have a shorter propagation distance because total internal reflection does not easily occur and therefore it performs a certain converging effect for the lights of the light source 12 and enhances the work efficiency of the light source 12.

With reference to FIGS. 2A and 2B, FIG. 2A is a top view of the conventional side-light type backlight module having a prism light guide plate and FIG. 2B is a cross-sectional view taken along the line A-A in FIG. 2A. Because of the existence of the light-exiting strip-shaped prisms 110 of the light guide plate, total refection may not occur for the lights which have already been reflected by sides 113 of the light guide plate due to the structure of the light-exiting strip-shaped prisms 110, and thereby cause light leakage B1 and B2 to occur at the junction between the light guide plate and the fixing plastic frame 13 and then affect the display quality of its corresponding liquid crystal display device.

Hence, it is necessary to provide a light guide plate and a corresponding backlight module to overcome the problems existing in the conventional technology.

SUMMARY OF THE INVENTION

The present invention provides a light guide plate and a corresponding backlight module which have reflecting prism structure mounted at two sides of the light guide plate to reduce light leakage phenomenon at the junction between the light guide plate and a fixing plastic frame. Hence, it solves the technical problem of the conventional prism light guide plate and its corresponding backlight module that light leakage phenomenon easily occurs at the junction between the light guide plate and the fixing plastic frame.

The present invention relates to a light guide plate having a plate body having an incident surface, a light-exiting surface being perpendicular to the incident surface and two side surfaces being perpendicular to both of the incident surface and the light-exiting surface, wherein the light-exiting surface including a reflecting area and a non-reflecting area, and the reflecting area is disposed at two ends of the light-exiting surface that are close to the side surfaces; a light-exiting prism structure mounted in the non-reflecting area and including a plurality of light-exiting strip-shaped prisms being parallel to each other, wherein a length direction of each of the light-exiting strip-shaped prisms is perpendicular to the incident surface and parallel to the side surfaces; and a reflecting prism structure mounted in the reflecting area of the light-exiting surface for reflecting lights back to the plate body; wherein the reflecting prism structure is a plane mirror; and the light guide plate is made by a hot-embossing process or a roll-forming process.

The present invention further relates to a light guide plate having a plate body having an incident surface, a light-exiting surface being perpendicular to the incident surface and two side surfaces being perpendicular to both of the incident surface and the light-exiting surface, wherein the light-exiting surface including a reflecting area and a non-reflecting area, and the reflecting area is disposed at two ends of the light-exiting surface that are close to the side surfaces; a light-exiting prism structure mounted in the non-reflecting area and including a plurality of light-exiting strip-shaped prisms being parallel to each other, wherein a length direction of each of the light-exiting strip-shaped prisms is perpendicular to the incident surface and parallel to the side surfaces; and a reflecting prism structure mounted in the reflecting area of the light-exiting surface for reflecting lights back to the plate body.

In one embodiment of the backlight module of the present invention,

In one embodiment of the light guide plate of the present invention, the reflecting prism structure is a plane mirror.

In one embodiment of the light guide plate of the present invention, the reflecting prism structure includes a plurality of reflecting strip-shaped prisms; the side surfaces are parallel to a length direction of each of the reflecting strip-shaped prisms; the adjacent reflecting strip-shaped prisms are gradually varied in height-to-width aspect ratio, wherein the reflecting strip-shaped prism being close to the side surfaces has a smaller height-to-width aspect ratio and the reflecting strip-shaped prism being far away from the side surfaces has a larger height-to-width aspect ratio, wherein the height-to-width aspect ratio is a ratio of a height and a width of the reflecting strip-shaped prism.

In one embodiment of the light guide plate of the present invention, the reflecting prism structure includes two plane mirrors and a plurality of reflecting strip-shaped prisms; the side surfaces are parallel to a length direction of each of the reflecting strip-shaped prisms; the adjacent reflecting strip-shaped prisms are gradually varied in height-to-width aspect ratio, wherein the plane mirrors are close to the side surfaces and the reflecting strip-shaped prism are far away from the side surfaces, wherein the reflecting strip-shaped prism being close to the plane mirrors has a smaller height-to-width aspect ratio and the reflecting strip-shaped prism being far away from the plane mirrors has a larger height-to-width aspect ratio, wherein the height-to-width aspect ratio is a ratio of a height and a width of the reflecting strip-shaped prism.

In one embodiment of the light guide plate of the present invention, each of the light-exiting strip-shaped prisms has the same height-to-width aspect ratio, and the height-to-width aspect ratio of the light-exiting strip-shaped prism is larger than or equal to the maximum height-to-width aspect ratio of the reflecting strip-shaped prism.

In one embodiment of the light guide plate of the present invention, the light guide plate is made by a hot-embossing process or a roll-forming process.

The present invention further relates to a backlight module which includes: a light source; a light guide plate mounted beside a light-emitting surface of the light source and having: a plate body having an incident surface, a light-exiting surface being perpendicular to the incident surface and two side surfaces being perpendicular to both of the incident surface and the light-exiting surface, wherein the light-exiting surface including a reflecting area and a non-reflecting area, and the reflecting area is disposed at two ends of the light-exiting surface that are close to the side surfaces; a light-exiting prism structure mounted in the non-reflecting area and including a plurality of light-exiting strip-shaped prisms being parallel to each other, wherein a length direction of each of the light-exiting strip-shaped prisms is perpendicular to the incident surface and parallel to the side surfaces; and a reflecting prism structure mounted in the reflecting area of the light-exiting surface for reflecting lights back to the plate body; and a fixing plastic frame used to fix the light guide plate via a part of the light guide plate that corresponds to the reflecting area.

In one embodiment of the backlight module of the present invention, the reflecting prism structure is a plane mirror.

In one embodiment of the backlight module of the present invention, the reflecting prism structure includes a plurality of reflecting strip-shaped prisms; the side surfaces are parallel to a length direction of each of the reflecting strip-shaped prisms; the adjacent reflecting strip-shaped prisms are gradually varied in height-to-width aspect ratio, wherein the reflecting strip-shaped prism being close to the side surfaces has a smaller height-to-width aspect ratio and the reflecting strip-shaped prism being far away from the side surfaces has a larger height-to-width aspect ratio, wherein the height-to-width aspect ratio is a ratio of a height and a width of the reflecting strip-shaped prism.

In one embodiment of the backlight module of the present invention, the reflecting prism structure includes two plane mirrors and a plurality of reflecting strip-shaped prisms; the side surfaces are parallel to a length direction of each of the reflecting strip-shaped prisms; the adjacent reflecting strip-shaped prisms are gradually varied in height-to-width aspect ratio, wherein the plane mirrors are close to the side surfaces and the reflecting strip-shaped prism are far away from the side surfaces, wherein the reflecting strip-shaped prism being close to the plane mirrors has a smaller height-to-width aspect ratio and the reflecting strip-shaped prism being far away from the plane mirrors has a larger height-to-width aspect ratio, wherein the height-to-width aspect ratio is a ratio of a height and a width of the reflecting strip-shaped prism.

In one embodiment of the backlight module of the present invention, each of the light-exiting strip-shaped prisms has the same height-to-width aspect ratio, and the height-to-width aspect ratio of the light-exiting strip-shaped prism is larger than or equal to the maximum height-to-width aspect ratio of the reflecting strip-shaped prism In one embodiment of the light guide plate of the present invention, the light guide plate is made by a hot-embossing process or a roll-forming process.

Practicing the light guide plate and the corresponding backlight module of the present invention has following advantage: mounting reflecting prism structure at two sides of the light guide plate to reduce light leakage phenomenon at the junction between the light guide plate and a fixing plastic frame, solving the technical problem of the conventional prism light guide plate and its corresponding backlight module that light leakage phenomenon easily occurs at the junction between the light guide plate and the fixing plastic frame.

In order to make the contents of the present invention to be more easily understood, the preferred embodiments of the present invention are described in detail in cooperation with accompanying drawings as follows:

DETAILED DESCRIPTION OF THE PREFERRED EMBODIMENTS

Figure 1:
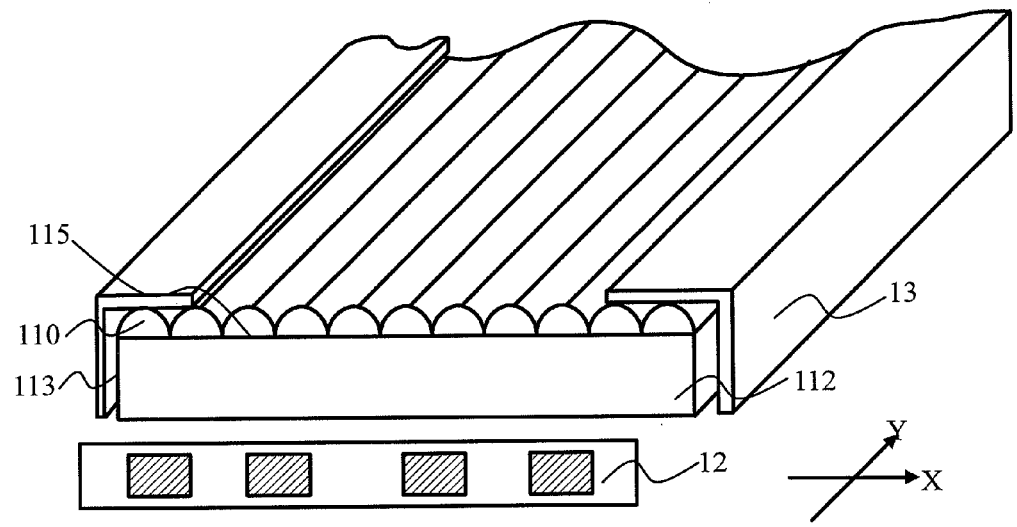
FIG. 1 is a structural view of a conventional side-light type backlight module having a prism light guide plate.

Following description of each embodiment is referring to the accompanying drawings so as to illustrate practicable specific embodiments in accordance with the present invention. The directional terms described in the present invention, such as upper, lower, front, rear, left, right, inner, outer, side and etc., are only directions referring to the accompanying drawings, so that the used directional terms are used to describe and understand the present invention, but the present invention is not limited thereto.

In the drawings, units with similar structure are labeled with the same reference number.

Figure 2A:
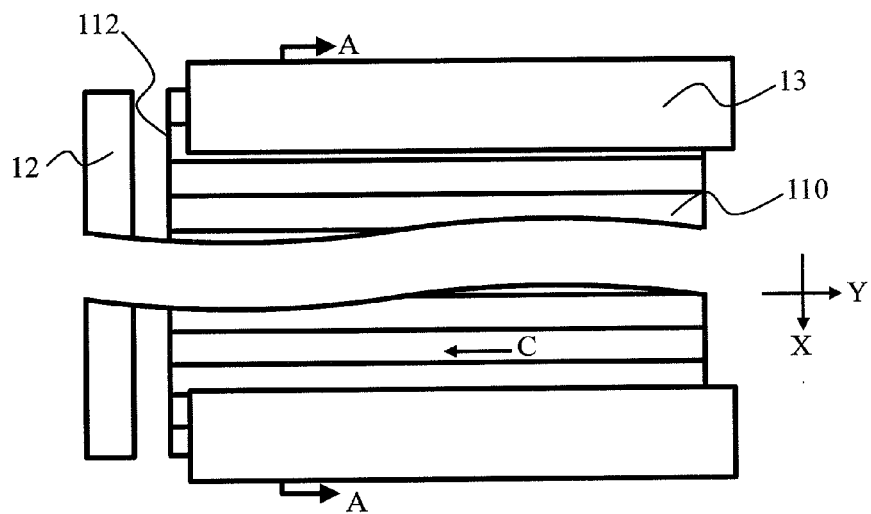
FIG. 2A is a top view of the conventional side-light type backlight module having a prism light guide plate.
Figure 2B:
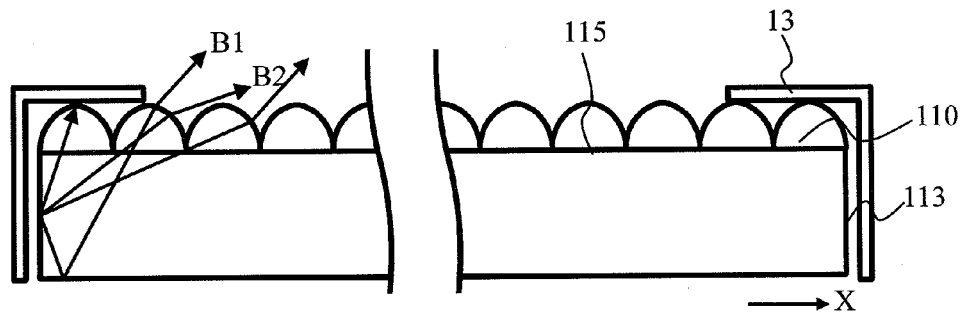
FIG. 2B is a cross-sectional view taken along a line A-A in FIG. 2A.
Figure 3:
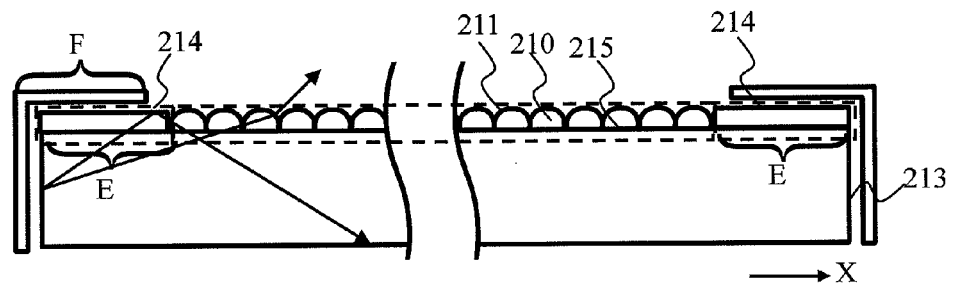
FIG. 3 is a structural side view of a first embodiment of a light guide plate in accordance with the present invention, which is also taken along the line A-A in FIG. 2A.

With reference to FIGS. 2A and 3, FIG. 3 is a structural side view of a first embodiment of a light guide plate in accordance with the present invention, which is taken along the line A-A in FIG. 2A. The light guide plate comprises plate body, a light-exiting prism structure 211 and a reflecting prism structure 214, wherein the plate body has a light-exiting surface 215, an incident surface and two side surface 213. The light-exiting structure 211 includes a plurality of light-exiting strip-shaped prisms 210 that provide a certain converging effect for incident lights. The reflecting prism structure 214 is used to reflect the lights travelling close to the side surfaces of the light guide plate back to the plate body so as to reduce light leakage at the ends of the side surfaces 213 of the light guide plate. In this embodiment, the reflecting prism structure 214 is a plane mirror.

The incident surface of the light guide plate is perpendicular to a length direction of each of the light-exiting strip-shaped prisms 210. The side surfaces 213 are parallel to the length direction of each of the light-exiting strip-shaped prisms 210. The light-exiting surface 215 is perpendicular to the side surfaces 213 and the incident surface. The light-exiting strip-shaped prisms 210 are mounted on the light-exiting surface 215 and the light-exiting strip-shaped prisms 210 are parallel to each other. The length direction of each of the light-exiting strip-shaped prisms 210 refers to an extension direction C of a longer edge of each of the light-exiting strip-shaped prism 210. The light-exiting surface 215 of the light guide plate includes a reflecting area E and a non-reflecting area, wherein the reflecting area E is disposed at two ends of the light-exiting surface that are close to the side surfaces 213. The plane mirror as the reflecting prism structure is mounted in the reflecting area E of the light-exiting surface, and the light-exiting strip-shaped prisms 210 as the light-exiting prism structure 211 is mounted in the non-reflecting area (refers to an area except the reflecting area E).

When using the light guide plate of the present invention, because the plane mirror is mounted in the reflecting area E on the light-exiting surface 215, the lights traveling towards the reflecting area E of the light-exiting surface 215 can easily meet a condition for total internal reflection to be reflected back into the plate body by the plane mirror. And with the light-exiting strip-shaped prisms 210, the non-reflecting area (refers to an area except the reflecting area E) of the light-exiting surface 215 can normally guide lights to a corresponding display panel while ensure the converging ability of the light-exiting strip-shaped prisms 210. Such light guide plate not only decreases light leakage at the two ends beside the side surfaces 213 but also increases light-output efficiency of the non-reflecting area of the light-exiting surface 215.

Being the reflecting prism structure 214, the plane mirror has a simple structure and can be made together with the light-exiting prism structure 211 by a hot-embossing process or a roll-forming process without additional manufacturing process. Hence, the practicing process is simple and the cost is low.

Figure 4:
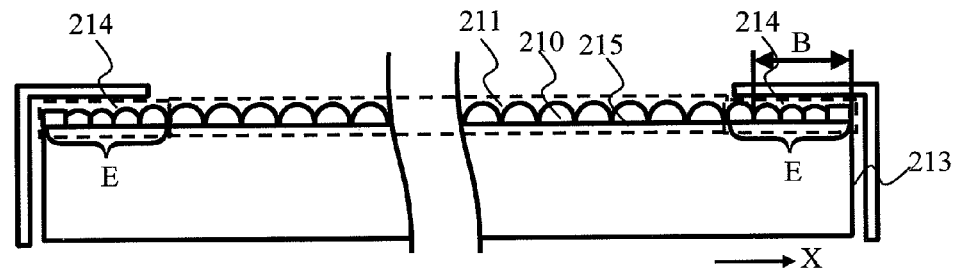
FIG. 4 is a structural side view of a second embodiment of the light guide plate in accordance with the present invention, which is also taken along the line A-A in FIG. 2A.
Figure 5:
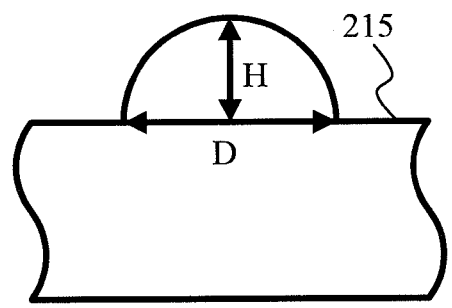
FIG. 5 is a partial enlarged side view of the light guide plate in accordance with the present invention.

With reference to FIGS. 2A and 4, FIG. 4 is a structural side view of a second embodiment of the light guide plate in accordance with the present invention, which is also taken along the line A-A in FIG. 2A. The embodiment differs from the first embodiment in that: the reflecting prism structure 214 includes a plurality of reflecting strip-shaped prisms. A length direction of each of the reflecting strip-shaped prisms is parallel to the side surfaces 213 of the light guide plate, wherein the length direction of each of the reflecting strip-shaped prisms refers to an extension direction of a longer edge of each of the reflecting strip-shaped prisms. With further reference to FIG. 5, FIG. 5 is a partial enlarged side view of the light guide plate in accordance with the present invention. A ratio of a height H and a width D of each of the strip-shaped prisms (the reflecting strip-shaped prisms and the light-exiting strip-shaped prisms 210) in the present invention is defined as a height-to-width aspect ratio of a strip-shaped prism. In this embodiment, the adjacent reflecting strip-shaped prisms are gradually varied in height-to-width aspect ratio, wherein the reflecting strip-shaped prism being close to the side surfaces 213 has a smaller height-to-width aspect ratio and the reflecting strip-shaped prism being far away from the side surfaces 213 has a larger height-to-width aspect ratio (the distance from the side surfaces 213 to the reflecting strip-shaped prisms refers to the distance from each of the reflecting strip-shaped prisms to the corresponding side surface 213 of light guide plate, such as the distance B in FIG. 4). Meanwhile, each of the light-exiting strip-shaped prisms 210 of the light-exiting prism structure 211 has the same height-to-width aspect ratio, and the height-to-width aspect ratio of the light-exiting strip-shaped prism 210 is larger than or equal to the maximum height-to-width aspect ratio of the reflecting strip-shaped prism (that is, the height-to-width aspect ratio of the reflecting strip-shaped prism which has the longest distance from the corresponding side surface 213 of the light guide plate).

When using the light guide plate of the present invention, because the reflecting strip-shaped prisms are mounted in the reflecting area E on the light-exiting surface 215, and the reflecting strip-shaped prism has larger height-to-width aspect ratio than the light-exiting prism 210, the lights traveling towards the reflecting area E of the light-exiting surface 215 can easily meet a condition for total internal reflection and thereby the reflecting strip-shaped prisms can reflect most of the lights back into the plate body.

Meanwhile, since the reflecting strip-shaped prisms are gradually varied in height-to-width aspect ratio, the surface of the overall light-exiting surface 215 can be more flat and continuous to avoid deformation of the shape of the light-exiting surface 215. Therefore, using a hot-embossing process or a roll-forming process to synchronously manufacture the reflecting prism structure 214 and the light-exiting prism structure 211 may result in a higher yield and not easily produce defective products.

Other technical features and advantages of this embodiment is the same as or similar to the technical features and advantages of the first embodiment, therefore please refer to the above description of the first embodiment.

Figure 6:
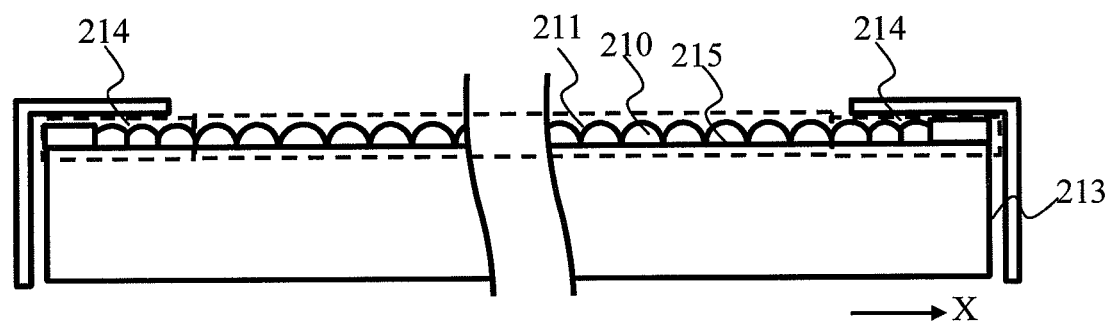
FIG. 6 is a structural side view of a third embodiment of the light guide plate in accordance with the present invention, which is also taken along the line A-A in FIG. 2A.

With reference to FIG. 6, FIG. 6 is a structural side view of a third embodiment of the light guide plate in accordance with the present invention, which is also taken along the line A-A in FIG. 2A. This embodiment differs from the second embodiment in that: the reflecting prism structure 214 includes two plane mirrors and a plurality of reflecting strip-shaped prisms. A length direction of each of the reflecting strip-shaped prisms is parallel to the side surfaces 213 of the light guide plate. The adjacent reflecting strip-shaped prisms are gradually varied in height-to-width aspect ratio. The plane mirrors of the reflecting prism structure 214 are respectively close to the corresponding side surfaces 213, and the reflecting strip-shaped prism of the reflecting prism structure 214 are far away from the corresponding side surfaces 213. The reflecting strip-shaped prism being close to the plane mirrors has a smaller height-to-width aspect ratio and the reflecting strip-shaped prism being far away from the plane mirrors has a larger height-to-width aspect ratio. Meanwhile, each of the light-exiting strip-shaped prisms 210 of the light-exiting prism structure 211 has the same height-to-width aspect ratio, and the height-to-width aspect ratio of the light-exiting strip-shaped prism 210 is larger than or equal to the maximum height-to-width aspect ratio of the reflecting strip-shaped prism (that is, the height-to-width aspect ratio of the reflecting strip-shaped prism which has the longest distance from the corresponding side surface 213 of the light guide plate).

This embodiment also avoids deformation of the shape of the light-exiting surface 215. Other technical features and advantages of this embodiment is the same as or similar to the technical features and advantages of the second embodiment, therefore please refer to the above description of the second embodiment.

The present invention further relates to a backlight module. The backlight module comprises a light source, a light guide plate mounted beside a light-emitting surface of the light source and a fixing plastic frame. The light source provides lights for image display. The light guide plate is used to guide the lights emitted from the light source to a corresponding display panel. The light guide plate has a plate body, a light-exiting prism structure and a reflecting prism structure, wherein the plate body has a light-exiting surface, an incident surface and two side surfaces. The light-exiting prism structure has a plurality of light-exiting strip-shaped prisms which can provide a certain converging effect for incident lights. The reflecting prism structure is used to reflect the lights being close to the side surfaces of the light guide plate back to the plate body so as to reduce light leakage at two ends beside the side surfaces of the light guide plate. The incident surface of the light guide plate is perpendicular to a length direction of each of the light-exiting strip-shaped prisms. The side surfaces are parallel to the length direction of each of the light-exiting strip-shaped prisms. The light-exiting surface is perpendicular to both the side surfaces and the incident surface. The light-exiting strip-shaped prisms are mounted on the light-exiting surface and the light-exiting strip-shaped prisms are parallel to each other. The length direction of each of the light-exiting strip-shaped prisms refers to an extension direction of a longer edge of each of the light-exiting strip-shaped prisms. The light-exiting surface of the light guide plate includes a reflecting area and a non-reflecting area, wherein the reflecting area is disposed at two ends of the light-exiting surface that are close to the side surface. The reflecting prism structure is mounted in the reflecting area of the light-exiting surface. The light-exiting strip-shaped prisms as the light-exiting prism structure are mounted in the non-reflecting area of the light-exiting surface. The fixing plastic frame fixes the light guide plate via a part of the light guide plate that corresponds to the reflecting area. The reflecting prism structure of the light guide plate of the backlight module of the present invention may be plane mirrors, a plurality of reflecting strip-shaped prisms or a combination of plane mirrors and reflecting strip-shaped prisms With reference to FIG. 3, a corresponding covering area F where the light guide plate is covered by the fixing plastic frame of the backlight module of the present invention is preferably smaller than the reflecting area E of the light-exiting surface of the light guide plate such that it can further reduce the light leakage phenomenon at the junction between the light guide plate and the fixing plastic plate. However, the size of the reflecting area does not limit the scope of the present invention. It will be considered to be within the scope of the present invention as long as there are reflecting areas disposed on the light-exiting surface at two ends beside the side surfaces and a reflecting prism structure for enhancing light reflection is mounted in the reflecting area.

The working theory and advantages of the backlight module of the present invention is the same as or similar to what has been described in the specific embodiments of the foregoing light guide plate, therefore please refer to the embodiments of the foregoing light guide plate.

By the above description, the light guide plate and the corresponding backlight module of the present invention use reflecting prism structure mounted at two sides of the light guide plate to reduce light leakage phenomenon at the junction between the light guide plate and a fixing plastic frame and thereby solve the technical problem of the conventional prism light guide plate and its corresponding backlight module that light leakage phenomenon easily occurs at the junction between the light guide plate and the fixing plastic frame.

The present invention has been described with a preferred embodiment thereof and it is understood that many changes and modifications to the described embodiment can be carried out without departing from the scope and the spirit of the invention that is intended to be limited only by the appended claims.

What is claimed is:
1. A light guide plate comprising:
a plate body having an incident surface, a light-exiting surface being perpendicular to the incident surface and two side surfaces being perpendicular to both of the incident surface and the light-exiting surface, wherein the light-exiting surface including a reflecting area and a non-reflecting area, and the reflecting area is disposed at two ends of the light-exiting surface that are close to the side surfaces;
a light-exiting prism structure mounted in the non-reflecting area and including a plurality of light-exiting strip-shaped prisms being parallel to each other, wherein a length direction of each of the light-exiting strip-shaped prisms is perpendicular to the incident surface and parallel to the side surfaces; and
a reflecting prism structure mounted in the reflecting area of the light-exiting surface for reflecting light which travels close to the side surfaces back to the plate body, wherein the reflecting prism structure includes two plane mirrors and a plurality of reflecting strip-shaped prisms; the side surfaces of the plate body are parallel to a length direction of each of the reflecting strip-shaped prisms; the adjacent reflecting strip-shaped prisms are gradually varied in height-to-width aspect ratio, wherein the plane mirrors are close to the side surfaces and the reflecting strip-shaped prism are far away from the side surfaces, wherein the reflecting strip-shaped prism being close to the plane mirrors has a smaller height-to-width aspect ratio and the reflecting strip-shaped prism being far away from the plane mirrors has a larger height-to-width aspect ratio, wherein the height-to-width aspect ratio is a ratio of a height and a width of the reflecting strip-shaped prism, wherein the plane mirrors and the reflecting strip-shaped prisms are disposed on the same plane.

2. The light guide plate as claimed in claim 1, wherein each of the light-exiting strip-shaped prisms has the same height-to-width aspect ratio, and the height-to-width aspect ratio of the light-exiting strip-shaped prism is larger than the maximum height-to-width aspect ratio of the reflecting strip-shaped prism.

3. The light guide plate as claimed in claim 1, wherein the light guide plate is made by a hot-embossing process or a roll-forming process.

4. A backlight module comprising:
a light source;
a light guide plate mounted beside a light-emitting surface of the light source and having:
a plate body having an incident surface, a light-exiting surface being perpendicular to the incident surface and two side surfaces being perpendicular to both of the incident surface and the light-exiting surface, wherein the light-exiting surface including a reflecting area and a non-reflecting area, and the reflecting area is disposed at two ends of the light-exiting surface that are close to the side surfaces;
a light-exiting prism structure mounted in the non-reflecting area and including a plurality of light-exiting strip-shaped prisms being parallel to each other, wherein a length direction of each of the light-exiting strip-shaped prisms is perpendicular to the incident surface and parallel to the side surfaces; and
a reflecting prism structure mounted in the reflecting area of the light-exiting surface for reflecting light which travels close to the side surfaces back to the plate body, wherein the reflecting prism structure includes two plane mirrors and a plurality of reflecting strip-shaped prisms; the side surfaces of the plate body are parallel to a length direction of each of the reflecting strip-shaped prisms; the adjacent reflecting strip-shaped prisms are gradually varied in height-to-width aspect ratio, wherein the plane mirrors are close to the side surfaces and the reflecting strip-shaped prism are far away from the side surfaces, wherein the reflecting strip-shaped prism being close to the plane mirrors has a smaller height-to-width aspect ratio and the reflecting strip-shaped prism being far away from the plane mirrors has a larger height-to-width aspect ratio, wherein the height-to-width aspect ratio is a ratio of a height and a width of the reflecting strip-shaped prism, wherein the plane mirrors and the reflecting strip-shaped prisms are disposed on the same plane; and a fixing plastic frame used to fix the light guide plate via a part of the light guide plate that corresponds to the reflecting area.

5. The backlight module as claimed in claim 4, wherein each of the light-exiting strip-shaped prisms has the same height-to-width aspect ratio, and the height-to-width aspect ratio of the light-exiting strip-shaped prism is larger than the maximum height-to-width aspect ratio of the reflecting strip-shaped prism.

6. The backlight module as claimed in claim 4, wherein the light guide plate is made by a hot-embossing process or a roll-forming process.

* * * * *